United States Patent
Ackermann et al.

(10) Patent No.: US 10,434,834 B2
(45) Date of Patent: Oct. 8, 2019

(54) METHOD FOR OPERATING A MOTOR VEHICLE, METHOD FOR ROLL COMPENSATION OF A MOTOR VEHICLE, AND MOTOR VEHICLE

(71) Applicant: ZF FRIEDRICHSHAFEN AG, Friedrichshafen (DE)

(72) Inventors: Norbert Ackermann, Eitorf (DE); Helmut Baalmann, Bergrheinfeld (DE); Andreas Förster, Schweinfurt (DE); Sven Greger, Bergrheinfeld (DE); Steffen Heyn, Niederwerrn (DE); Holger Kirchner, Ruppichteroth (DE); Sven Philip Krüger, Würzburg (DE); Thomas Manger, Wasserlosen (DE); Hendrik Marquar, Schweinfurt (DE); Christian Maurischat, Euerbach (DE); Stefan Rappelt, Sulzheim (DE); Alexander Schwarz, Thuengen (DE); Jens Seiler, Kürnach (DE); Achim Thomae, Bergrheinfeld (DE); Michael Triebel, Oberschwarzach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 172 days.

(21) Appl. No.: 15/536,038

(22) PCT Filed: Nov. 18, 2015

(86) PCT No.: PCT/EP2015/076898
§ 371 (c)(1),
(2) Date: Jun. 14, 2017

(87) PCT Pub. No.: WO2016/096292
PCT Pub. Date: Jun. 23, 2016

(65) Prior Publication Data
US 2018/0370319 A1    Dec. 27, 2018

(30) Foreign Application Priority Data

Dec. 15, 2014 (DE) .......................... 10 2014 225 929

(51) Int. Cl.
*B60G 17/016* (2006.01)
*B60G 21/00* (2006.01)
(Continued)

(52) U.S. Cl.
CPC ......... *B60G 17/0162* (2013.01); *B60G 17/06* (2013.01); *B60G 21/005* (2013.01);
(Continued)

(58) Field of Classification Search
USPC .......................................................... 701/37
See application file for complete search history.

(56) References Cited

U.S. PATENT DOCUMENTS

| | | | |
|---|---|---|---|
| 4,919,444 A | 4/1990 | Lieber | |
| 6,519,517 B1 * | 2/2003 | Heyring | B60G 21/06 280/124.159 |

(Continued)

FOREIGN PATENT DOCUMENTS

| | | |
|---|---|---|
| DE | 41 36 262 | 5/1993 |
| DE | 10 2004 055177 | 5/2006 |

(Continued)

*Primary Examiner* — Tyler D Paige
(74) *Attorney, Agent, or Firm* — Cozen O'Connor

(57) ABSTRACT

A method for operating a motor vehicle with a chassis arrangement having at least two vibration dampers. A body control is carried out at least partially with the vibration dampers. The chassis arrangement further has at least one stabilizer. During transverse accelerations below a threshold acceleration the stabilizer contributes to the body control less than the vibration dampers and contributes more than the vibration dampers from the threshold acceleration upward.

18 Claims, 3 Drawing Sheets

(51) Int. Cl.
  *B60G 17/06* (2006.01)
  *B60G 21/055* (2006.01)
  *B60G 21/073* (2006.01)

(52) U.S. Cl.
  CPC ......... *B60G 21/055* (2013.01); *B60G 21/073* (2013.01); *B60G 2202/135* (2013.01); *B60G 2400/0511* (2013.01); *B60G 2400/104* (2013.01); *B60G 2500/10* (2013.01); *B60G 2500/20* (2013.01); *B60G 2600/02* (2013.01); *B60G 2800/012* (2013.01); *B60G 2800/85* (2013.01); *B60G 2800/9122* (2013.01)

(56) References Cited

U.S. PATENT DOCUMENTS

| | | |
|---|---|---|
| 2007/0018414 A1 | 1/2007 | Yasui et al. |
| 2008/0051958 A1* | 2/2008 | Pelchen ............... B60G 17/016 701/37 |
| 2009/0121444 A1* | 5/2009 | Bushko .............. B60G 17/0157 280/5.507 |
| 2009/0260935 A1 | 10/2009 | Avadhany et al. |
| 2010/0207343 A1 | 8/2010 | Sano |
| 2011/0208391 A1 | 8/2011 | Mizuta et al. |
| 2013/0041545 A1* | 2/2013 | Bar ................... B60G 17/0162 701/23 |
| 2013/0147205 A1 | 6/2013 | Tucker et al. |
| 2013/0218414 A1* | 8/2013 | Meitinger .......... B60G 17/0162 701/38 |
| 2014/0260233 A1* | 9/2014 | Giovanardi ......... F15B 13/0444 60/431 |
| 2014/0265168 A1 | 9/2014 | Giovanardi et al. |
| 2015/0224845 A1* | 8/2015 | Anderson ............ B60G 17/019 701/37 |
| 2015/0298691 A1* | 10/2015 | Kodaira ............... B62D 15/025 701/48 |
| 2018/0370319 A1* | 12/2018 | Ackermann ....... B60G 17/0162 |

FOREIGN PATENT DOCUMENTS

| | | |
|---|---|---|
| DE | 10 2004 05661 | 6/2006 |
| DE | 60 2005 003437 | 10/2008 |
| DE | 10 2008 005247 | 6/2009 |
| DE | 10 2008 024092 | 11/2009 |
| DE | 10 2009 022328 | 6/2010 |
| DE | 10 2011 076973 | 12/2012 |
| JP | S60 157910 | 8/1985 |
| JP | 2006 007803 | 1/2006 |
| JP | 2006 256368 | 9/2006 |
| JP | 2006 282036 | 10/2006 |
| JP | 2007 030574 | 2/2007 |
| WO | WO 2009/096094 | 8/2008 |
| WO | WO 2010/122418 | 10/2010 |
| WO | WO 2014/066469 | 5/2015 |

* cited by examiner ately can be optimized separately. A similar construction is shown in WO 2014/066469 A1. In this case, the adjustable damping forces are generated via adjustable valves, one for the rebound direction and one for the compression direction, and the body control is carried out via a motor-pump unit.

METHOD FOR OPERATING A MOTOR VEHICLE, METHOD FOR ROLL COMPENSATION OF A MOTOR VEHICLE, AND MOTOR VEHICLE

CROSS REFERENCE TO RELATED APPLICATIONS

This is a U.S. national stage of application No. PCT/EP2015/076898, filed on Nov. 18, 2015. Priority is claimed on German Application No. DE102014225929.0, filed Dec. 15, 2014, the content of which is incorporated here by reference.

BACKGROUND OF THE INVENTION

1. Field of the Invention

The invention is directed to a method for operating a motor vehicle with a chassis arrangement having at least four vibration dampers, wherein a body control is carried out at least partially with vibration dampers.

2. Description of the Prior Art

As is known, body control involves stabilizing or balancing the vehicle body, i.e., the body of the vehicle in the broadest sense, such that, for example, on inclined surfaces such as hillsides, on uneven terrain, or when cornering, the effects on the body are reduced. This also includes, for example, rolling or pitching of the motor vehicle, which must be controlled or reduced.

This function cannot be carried out by conventional vibration dampers. Both monotube dampers and twin-tube dampers are known, but are configured only for vibration damping.

Further, body control is to be distinguished from wheel control which comes into question when a vibration damper has an adjustable damping force. An adjustable damping force can be generated, for example, through an adjustable valve with which the flow resistance for the hydraulic medium in the vibration damper can be varied so that the damping force is also varied.

There are a number of different known systems by which body control can be carried out. For example, US 2009/0260935 A1 discloses a vibration damper that has a gerotor, i.e., a device that can be operated both as motor and as generator, which is coupled to a pump. This apparatus can be used to recuperate energy and to perform a body control and a wheel control. Accordingly, wheel control, body control and recuperation are achieved by the same apparatus. A vibration damper having the same operating principle is further disclosed in US 2013/0147205 A1 and US 2014/0265168 A1.

In contrast, DE 10 2009 022 328 A1 discloses a vibration damper in which the wheel control is carried out by a pressure regulating valve and the body control is carried out by a motor-pump unit. In this construction, the body control and the wheel control are implemented by independent units that can accordingly be optimized separately. A similar construction is shown in WO 2014/066469 A1. In this case, the adjustable damping forces are generated via adjustable valves, one for the rebound direction and one for the compression direction, and the body control is carried out via a motor-pump unit.

In order to utilize the vibration damper to compensate for road irregularities, it is known to use sensor data of cameras and, on this basis, to compensate the changing distance between vehicle body and road level such that road irregularities are not transmitted, or at least not transmitted in their entirety, to the vehicle body.

In this regard, the known systems have the problem that the body control consumes a large amount of energy. In particular, during leveling that persists over a longer periods of time, for example, when driving with a trailer or when driving on a slope, high actuating forces must be realized over a longer period of time and corresponding energy is consumed depending on the system configuration.

SUMMARY OF THE INVENTION

It is an object of one aspect of the present application to provide a method for operating a motor vehicle with a chassis arrangement such as has been described having a reduced energy consumption.

In order to meet this object, a method of the type described above is suggested in which the chassis arrangement further has at least one non-passive stabilizer, and during transverse accelerations the stabilizer contributes to the body control less than the vibration dampers below a threshold acceleration and contributes more than the vibration dampers above the threshold acceleration.

The core of one aspect of the invention is considered to be that the chassis arrangement is expanded by at least one stabilizer, and this stabilizer is preferably also utilized only occasionally. A stabilizer is any stabilizer operated electrically or hydraulically in any manner or constructed so as to be purely passive.

In one embodiment, a switchable, non-passive stabilizer can be used. Accordingly, this stabilizer is electrically switchable in any manner and is therefore a consumer. It has turned out that the energy consumption of a non-passive stabilizer is lower than the energy consumption of vibration dampers in certain acceleration ranges. Consequently, body control can be carried out solely by vibration dampers below a threshold acceleration and with the addition of at least one non-passive stabilizer above or from the threshold acceleration upward.

Alternatively, a passive stabilizer with a progressive characteristic can be used. Consequently, at low transverse accelerations, part of the roll compensation is performed by the vibration dampers.

In this respect, a stabilizer cannot take on all functions during body control, but it can provide for roll compensation, although not to compensate for pitching of the vehicle. However, it is precisely roll compensation that must be carried out under certain environmental conditions such as driving on slopes over longer periods of time, while pitch compensation per se is required only in extreme accelerations and, therefore, is also to be undertaken only for short durations.

In a particularly advantageous manner, the threshold acceleration can be between $3 \text{ m/s}^2$ and $4 \text{ m/s}^2$. As has been described, the energy consumption of the vibration dampers and of the stabilizer changes as a function of acceleration. It has been discovered that a transition takes place in the specified range such that the stabilizer or stabilizers work in a more energy-efficient manner than the vibration dampers.

During transverse accelerations below the threshold acceleration, a resulting roll angle of the motor vehicle can preferably be at least partially compensated by the vibration dampers. Accordingly, it is not necessary, but it is also not excluded, that the vibration dampers and possibly the stabilizer completely compensate for the roll angle resulting from the acceleration forces. Rather, it can also be provided that only a portion of the roll angle is compensated. However, in a particularly preferred manner the vibration dampers completely compensate for the roll angle. Accordingly, it is achievable that there is a roll angle of 0 as initial position when switching on the stabilizer or when omitting the vibration dampers.

As an alternative to compensating for the roll angle by the vibration dampers, no compensation of the roll angle need take place at all; however, abruptly switching on the stabilizer could then lead to a waddling motion of the vehicle which is perceived as unpleasant.

In a particularly preferred manner, it can be provided that during transverse accelerations from the threshold acceleration upward a resulting roll angle of the motor vehicle is at least partially compensated by the vibration dampers and the at least one stabilizer. Alternatively, during transverse accelerations from the threshold acceleration upward a resulting roll angle of the motor vehicle can be at least partially compensated solely by the at least one stabilizer. In other words, basically from the threshold acceleration upward an at least partial roll compensation can take place either through the stabilizer alone or through a combination of stabilizer and vibration dampers.

In further development of the first embodiment, it can also be provided that from the threshold acceleration upward a resulting roll angle of the motor vehicle is at least partially compensated by the vibration dampers and the at least one stabilizer, and from a second threshold acceleration upward, which is greater than the described threshold acceleration, a resulting roll angle of the motor vehicle is at least partially compensated solely by the at least one stabilizer. In this case, that is, there are three compensation ranges.

Further, it is conceivable to add the vibration dampers to the body control again from a third threshold acceleration upward in case the performance of the non-passive stabilizer is insufficient.

A nonlinear torsion bar can advantageously be used as stabilizer.

In addition, the invention is directed to a method for roll compensation in a motor vehicle body by at least two different roll compensation arrangements. This is characterized in that the roll angle of the motor vehicle body depending on a transverse acceleration of the motor vehicle, the first roll compensation arrangement contributes more to the roll compensation than the second roll compensation arrangement in the range of a transverse acceleration from 0 up to a first threshold acceleration, and the second roll compensation arrangement contributes more to the roll compensation than the first roll compensation arrangement in the range of a transverse acceleration from the first threshold acceleration upward, and the roll angle is at least partially compensated in each instance.

In this method, only the roll compensation is taken into account and not a possible pitch compensation, which is carried out via the vibration dampers. In contrast to the prior art in which either vibration dampers or stabilizers are provided for roll compensation, two different roll compensation arrangements are used simultaneously and, depending on the transverse acceleration, the roll compensation is divided up such that primarily the first roll compensation arrangement provides for an at least partial roll compensation in the one range and primarily the second roll compensation arrangement provides for an at least partial roll compensation in the second range.

The roll angle of the motor vehicle body can preferably be at least partially compensated depending on a transverse acceleration of the motor vehicle in the range of a transverse acceleration from a first threshold acceleration up to a second threshold acceleration by the first roll compensation arrangement and second roll compensation arrangement, and the roll angle can be compensated at least partially solely through the second roll compensation arrangement in the range of a transverse acceleration from the second threshold acceleration upward. Accordingly, in a further development of the basic form, it is provided that between the ranges in which the first roll compensation arrangement and the second roll compensation arrangement provide for a roll compensation there is an overlapping range in which both roll compensation arrangements provide for a roll compensation, wherein the contribution of the first roll compensation arrangement decreases with increasing transverse acceleration. Consequently, only the second roll compensation arrangement is responsible for roll compensation upwards of the second threshold acceleration. As a result of this step, a smoother transition is achieved when changing between roll compensation arrangements.

Depending on a transverse acceleration of the motor vehicle, the roll angle of the motor vehicle body can advantageously be compensated at least partially solely by the second roll compensation arrangement in the range of a transverse acceleration from the second threshold acceleration to a third threshold acceleration, and the roll angle can be at least partially compensated at least partially by the first roll compensation arrangement and the second roll compensation arrangement in the range of a transverse acceleration from the third threshold acceleration upward. In the event that the second roll compensation arrangement cannot provide for a satisfactory roll compensation at high transverse accelerations, the first roll compensation arrangement can assist the second roll compensation arrangement.

The second roll compensation arrangement can preferably be switched off at a transverse acceleration of the motor vehicle in the range of a transverse acceleration from 0 to the first threshold acceleration. This should make it clear that the second roll compensation arrangement is not a passive arrangement which is configured to operate only from the first threshold acceleration upward. On the contrary, it is preferably a non-passive roll compensation arrangement that can be switched on and off accordingly. Preferably, a set of vibration dampers, particularly four vibration dampers, is used as first roll compensation arrangement. Of course, the quantity of vibration dampers can be adapted to the circumstances of the motor vehicle; for passenger vehicles, four vibration dampers are usually used. There are also motor vehicles with more than two axles in which more vibration dampers must be provided correspondingly. It is also preferable that the second roll compensation arrangement is configured as non-passive stabilizer.

In addition, the invention is directed to a motor vehicle with a chassis arrangement comprising at least two vibration dampers, wherein a body control can be carried out at least partially with the vibration dampers. This is characterized in that the chassis arrangement further has at least one non-passive stabilizer. The motor vehicle can be a passenger vehicle, a truck or a motorcycle.

The limitation of the body control must be understood in a twofold respect. On the one hand, a complete body control need not be carried out; rather, it is sufficient that a roll compensation takes place. This roll compensation also need not be carried out completely, i.e., an existing roll angle can merely be decreased, it need not be reduced to 0.

As has also been described more than once, it is known to use stabilizers for roll compensation. Further, the prior art describes vibration dampers as alternatives. However, it is not known to use vibration dampers and stabilizers simultaneously for roll compensation.

The chassis arrangement can advantageously have two stabilizers. More precisely, the chassis arrangement can have one stabilizer per axle so that a roll compensation can take place at each axle.

The stabilizer can preferably be switchable depending on a transverse acceleration of the motor vehicle. All of the details and features which have been described referring to the method can also be implemented in the motor vehicle. For this purpose, of course, the motor vehicle has a control unit that can switch the stabilizer or stabilizers, for example, off and on depending on sensor signals about the transverse acceleration.

It also goes without saying that the method is implemented in an automated manner with a control unit, which control unit can have recourse to sensor signals. Further, the control unit can have recourse to characteristics relating to roll angle compensation, etc. insofar as necessary. For example, whether the vibration dampers carry out a complete roll compensation or only a partial roll compensation can be controlled using characteristic data. All of this can also be controlled depending on the acceleration.

The stabilizer can advantageously be constructed as a nonlinear torsion bar.

BRIEF DESCRIPTION OF THE DRAWINGS

Further advantages, features and details follow from the embodiment examples and figures described in the following. In the drawings.

DETAILED DESCRIPTION OF THE PRESENTLY PREFERRED EMBODIMENTS

Figure 1:
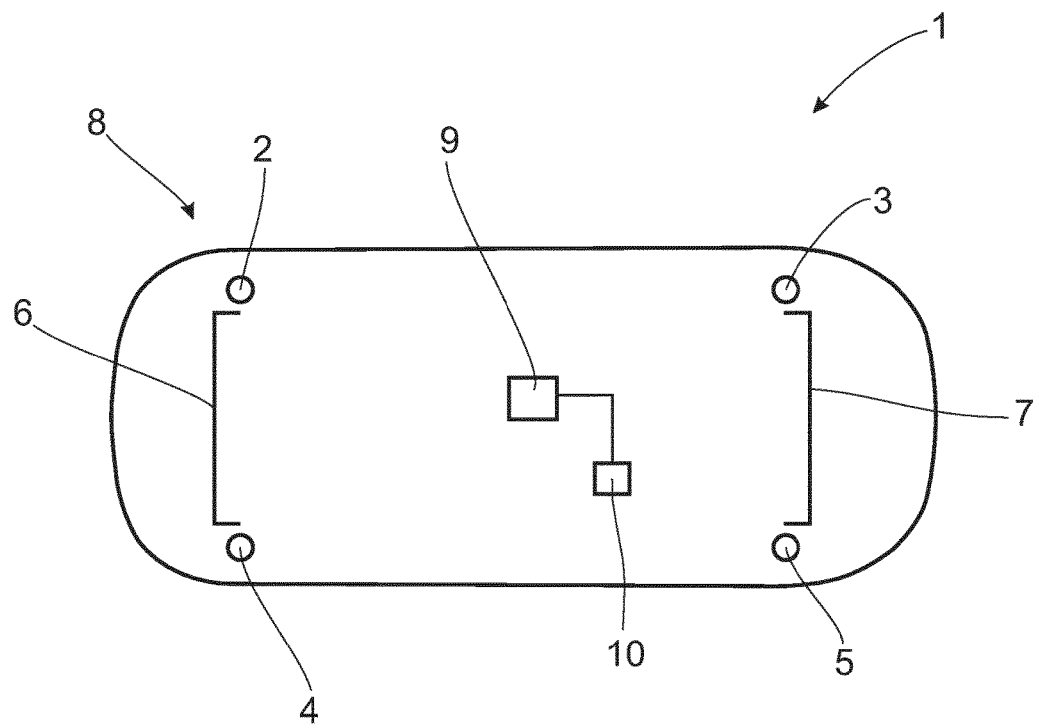
FIG. 1 is a motor vehicle.

FIG. 1 shows a motor vehicle 1 with vibration dampers 2, 3, 4, and 5 and stabilizers 6 and 7. The vibration dampers 2, 3, 4, and 5 and the stabilizers 6 and 7 form a chassis arrangement 8. A control unit 9, which has recourse to measurement data of a transverse acceleration sensor 10, is further provided for controlling the chassis arrangement 8. The functioning of the chassis arrangement 8 will be described more fully referring to FIG. 2.

Figure 2:
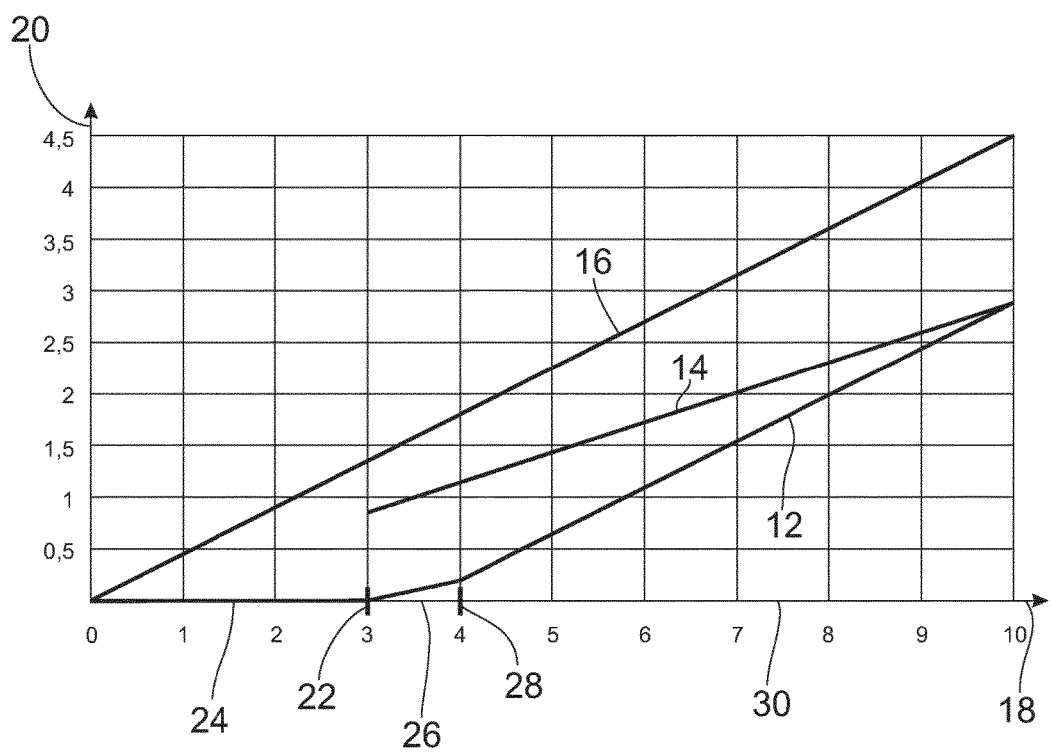
FIG. 2 are several characteristic lines.

FIG. 2 shows three lines 12, 14, and 16 plotted against the axes 18 and 20. The transverse acceleration is plotted in m/s² on axis 18, the roll angle is plotted in degrees on axis 20. Line 16 shows the roll angle of a purely passive vehicle. As transverse acceleration increases, the roll angle also increases.

Line 12, on the other hand, shows the resulting roll angle for the motor vehicle body and chassis arrangement 8 described above. Up to a first threshold speed 22 by which a first range 24 is defined, a roll compensation is carried out solely by the vibration dampers 2, 3, 4, and 5. The latter provide for a complete roll compensation, for which reason the resulting roll angle at a transverse acceleration of from 0 to 3 m/s² is equal to 0. From the first threshold speed 22 upward, the stabilizers 6 and 7 are switched on. The characteristic line of a stabilizer is shown in line 14. It will be seen that while a stabilizer provides for a roll compensation in proportion to the transverse acceleration, it does not provide for a complete roll compensation. Accordingly, as transverse acceleration increases the resulting roll angle also increases constantly.

In range 26 which extends from the first threshold acceleration 22 to the second threshold acceleration 28, the vibration dampers 2, 3, 4, and 5 as well as the stabilizers 6 and 7 provide for a roll compensation. Consequently, there is a gently rising curve because the contribution of the vibration dampers steadily decreases with increasing transverse acceleration. Starting after the second threshold acceleration 28 is the third range 30 in which only stabilizers 6 and 7 provide for a roll compensation. The vibration dampers 2, 3, 4, and 5 can also provide for pitch compensation, if necessary, during these transverse accelerations. However, the vibration dampers 2, 3, 4, and 5 do not assume any roll compensating function.

Accordingly, line 14 can also be observed ideally for a passive stabilizer. In reality, this passive stabilizer also contributes to roll compensation below the threshold acceleration 22.

Figure 3:
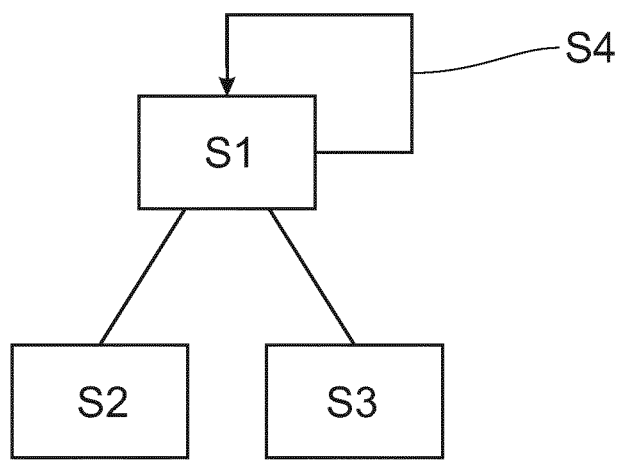
FIG. 3 is a flow chart.

FIG. 3 shows a flowchart for a method for operating a motor vehicle 1. In step S1, the control unit 9 queries the transverse acceleration values of the motor vehicle 1. If the transverse acceleration is less than the first threshold acceleration, the vibration dampers 2, 3, 4, and 5 are adjusted such that the roll angle resulting from the transverse acceleration is compensated so that, overall, no roll angle exists in the vehicle body. However, if the transverse acceleration is equal to or greater than the first threshold acceleration, the stabilizers 6 and 7 are switched on in step S3. Further, the adjustment of the vibration dampers 2, 3, 4, and 5 is carried out depending on the transverse acceleration, and vibration dampers 2, 3, 4, and 5 provide decreasingly for roll compensation with increasing transverse acceleration and are no longer used at all for roll compensation from the second threshold acceleration upward. This behavior is stored in characteristic lines to which the control unit 9 can have recourse.

When no transverse acceleration is present, a predetermined time expires and then the transverse accelerations are again queried in step S4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a motor vehicle with a chassis arrangement having at least two vibration dampers and at least one stabilizer, the method comprising:
performing at least partial body control by the at least two vibration dampers; and
performing the at least partial body control by the at least one stabilizer, wherein during transverse accelerations the at least one stabilizer contributes to the body control less than the at least two vibration dampers below a threshold acceleration and contributes more than the at least two vibration dampers above the threshold acceleration.

2. The method according to claim 1, wherein the at least one stabilizer is configured as a passive stabilizer with a progressive characteristic.

3. The method according to claim 1, wherein the at least one stabilizer is configured as a nonlinear torsion bar.

4. The method according to claim 1, wherein the at least one stabilizer is switchable and is switched off at transverse accelerations below the threshold acceleration and is switched on at transverse accelerations greater than or equal to the threshold acceleration.

5. The method according to claim 1, wherein only the at least one stabilizer performs at least partial roll compensation at accelerations greater than or equal to the threshold acceleration.

6. The method according to claim 1, wherein the threshold acceleration is between 3 m/s$^2$ and 4 m/s$^2$.

7. The method according to claim 1, wherein during transverse accelerations below the threshold acceleration, a resulting roll angle of the motor vehicle is at least partially compensated by the at least two vibration dampers.

8. The method according to claim 7, wherein the roll angle of the motor vehicle is completely compensated at transverse accelerations below the threshold acceleration.

9. The method according to claim 1, wherein during transverse accelerations greater than or equal to the threshold acceleration a resulting roll angle of the motor vehicle is at least partially compensated by the at least two vibration dampers and the at least one stabilizer.

10. The method according to claim 1, wherein during transverse accelerations greater than or equal to the threshold acceleration a resulting roll angle of the motor vehicle is at least partially compensated solely by the at least one stabilizer.

11. A method for roll compensation in a motor vehicle body by at least two different roll compensation arrangements, wherein a roll angle of the motor vehicle body is compensated depending on a transverse acceleration of a motor vehicle,
performing at least partial roll compensation by a first roll compensation arrangement that contributes more to the roll compensation than a second roll compensation arrangement in a range of a transverse acceleration from 0 up to a first threshold acceleration; and
performing the at least partial roll compensation by the second roll compensation arrangement that contributes more to the roll compensation than the first roll compensation arrangement in a range of a transverse acceleration greater than the first threshold acceleration, wherein the roll angle is at least partially compensated in each instance.

12. The method according to claim 11, wherein the roll angle of the motor vehicle body is at least partially compensated by the first roll compensation arrangement and the second roll compensation arrangement based at least in part on the transverse acceleration of the motor vehicle from the first threshold acceleration to a second threshold acceleration, and the roll angle is compensated at least partially solely through the second roll compensation arrangement from the second threshold acceleration upward.

13. The method according to claim 12, wherein, depending on the transverse acceleration of the motor vehicle, the roll angle of the motor vehicle body is compensated at least partially solely by the second roll compensation arrangement from the second threshold acceleration to a third threshold acceleration, and the roll angle is at least partially compensated at least partially by the first roll compensation arrangement and the second roll compensation arrangement from the third threshold acceleration upward.

14. The method according to claim 11, wherein the second roll compensation arrangement is switched off at a transverse acceleration of the motor vehicle in the range of a transverse acceleration from 0 to the first threshold acceleration.

15. A motor vehicle with a chassis arrangement comprising:
at least two vibration dampers, wherein body control can be carried out at least partially with the at least two vibration dampers; and
at least one stabilizer.

16. The motor vehicle according to claim 15, wherein the chassis arrangement has two stabilizers.

17. The motor vehicle according to claim 15, wherein the at least one stabilizer is switchable depending on a transverse acceleration of the motor vehicle.

18. The motor vehicle according to claim 15, wherein the at least one stabilizer is configured as a nonlinear torsion bar.

* * * * *